United States Patent [19]

Hale et al.

[11] Patent Number: 4,789,366
[45] Date of Patent: Dec. 6, 1988

[54] MARINE PROPULSION DEVICE BALL CLUTCH TRANSMISSION

[75] Inventors: Gordon B. Hale, Waukegan; Donald J. Friddle, Kenosha; Edward D. McBride, Waukegan, all of Ill.

[73] Assignee: Outboard Marine Corporation, Waukegan, Ill.

[21] Appl. No.: 65,941

[22] Filed: Jun. 24, 1987

[51] Int. Cl.$^4$ .............................................. B63H 5/12
[52] U.S. Cl. ........................................ 440/75; 74/332; 192/44
[58] Field of Search ................. 440/75, 900; 74/333–335, 371–372, 378; 192/38, 45, 51, 48.1, 48.91, 21, 44

[56] References Cited

U.S. PATENT DOCUMENTS

| | | | |
|---|---|---|---|
| 2,772,578 | 12/1956 | Kling | 74/625 |
| 2,843,237 | 7/1958 | Carr | 192/40 |
| 2,870,892 | 1/1959 | Hiner | 192/90 |
| 3,882,814 | 5/1975 | Shimanckas | 440/75 |
| 3,931,783 | 1/1976 | Croisant | 440/75 |
| 4,223,773 | 9/1980 | Croisant et al. | 192/48.91 |
| 4,244,454 | 1/1981 | Bankstahl | 192/21 |
| 4,400,163 | 8/1983 | Blanchard | 440/75 |
| 4,510,816 | 4/1985 | Linden | 74/372 |
| 4,527,441 | 7/1985 | Nakahama | 74/378 |
| 4,570,776 | 2/1986 | Iwashita et al. | 192/114 |
| 4,579,204 | 4/1986 | Iio | 192/21 |

Primary Examiner—Joseph F. Peters, Jr.
Assistant Examiner—Jesûs D. Sotelo
Attorney, Agent, or Firm—Michael, Best & Friedrich

[57] ABSTRACT

A marine propulsion device comprising a ball clutch transmission including a propeller shaft including an axial bore defining an annular wall having therethrough a radially extending aperture communicating with the bore, a ball located in the aperture, an actuator extending in the axial bore in the propeller shaft and being movable between axially spaced drive and neutral positions, the actuator including an axially extending groove, the groove including a deep portion having a cross sectional contour of such dimension as to permit receipt therein of at least a portion of the ball so as to disengage the ball from a driven bevel gear, the groove also including a shallow portion located adjacent the deep portion and having a cross sectional contour such that engagement of the shallow portion with the ball forces the ball radially outwardly so that the ball is engaged by the gear, the shallow portion also including a section which slopes radially inwardly and toward the deep portion, whereby the force exerted on the section by the ball biases the actuator toward the neutral position.

39 Claims, 3 Drawing Sheets

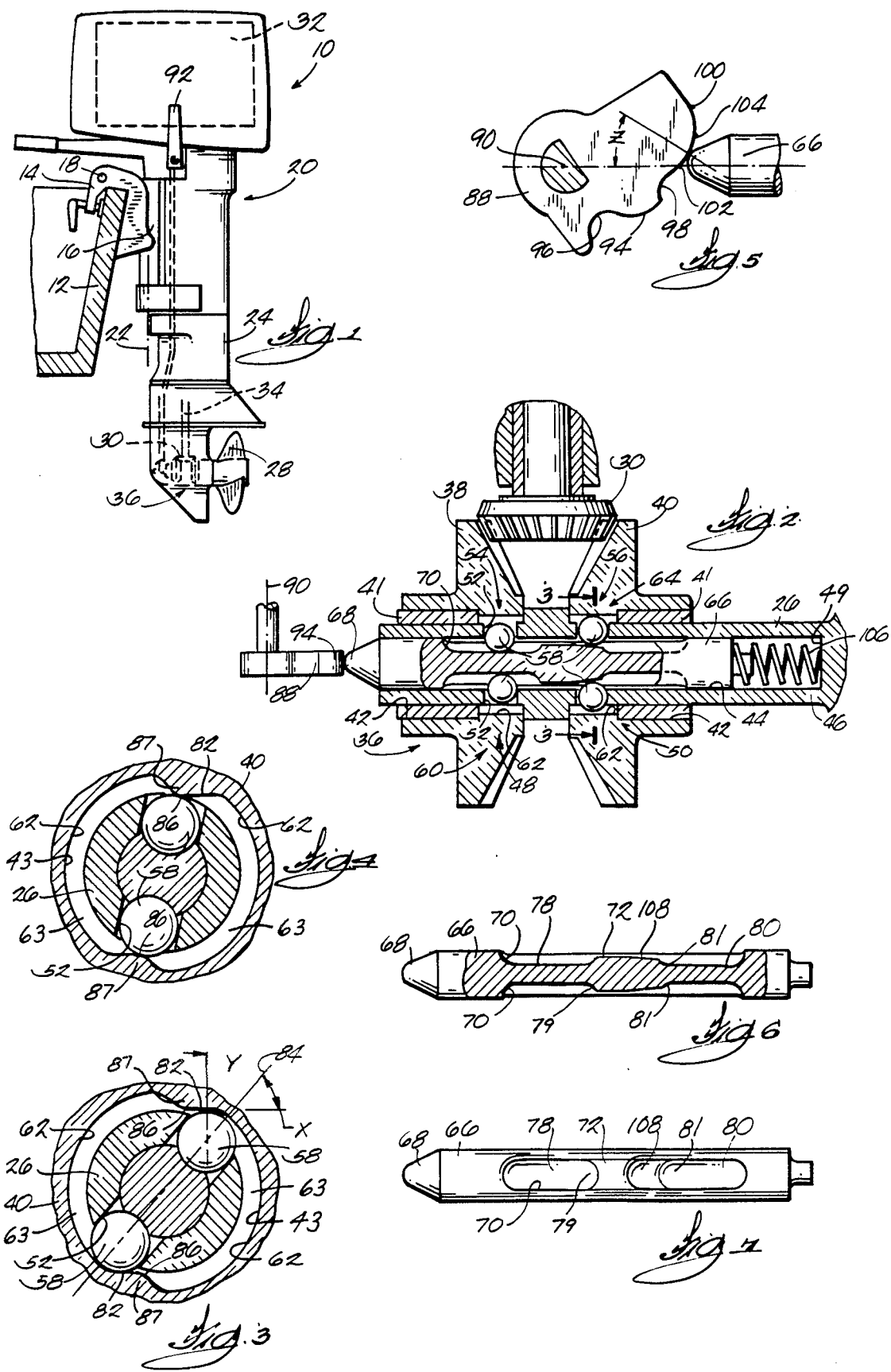

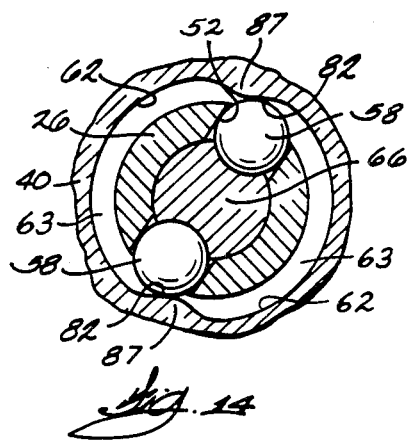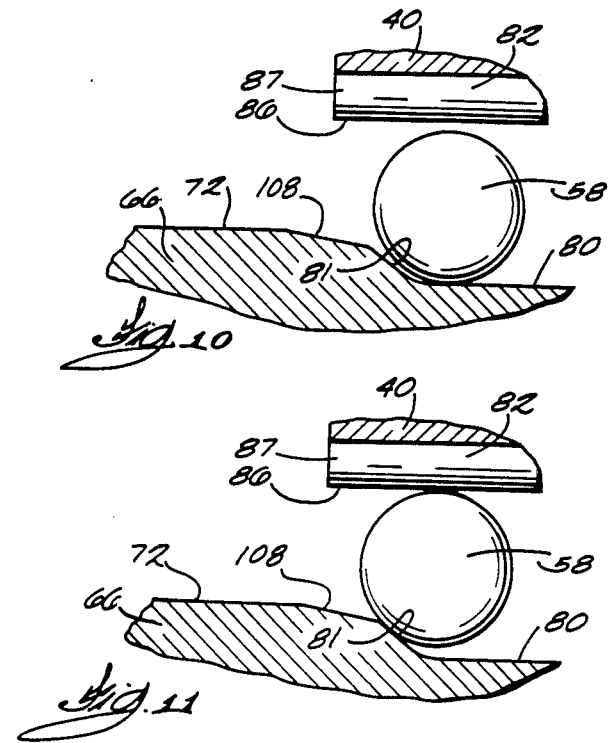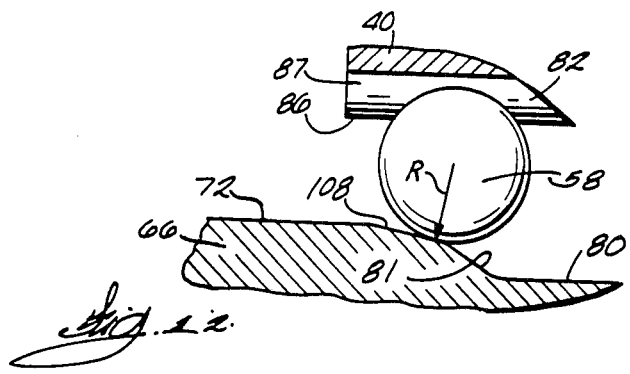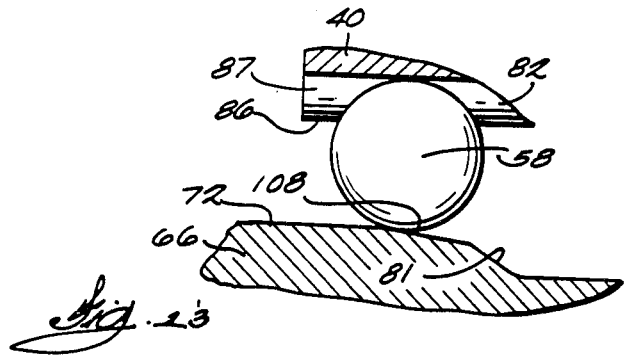

MARINE PROPULSION DEVICE BALL CLUTCH TRANSMISSION

BACKGROUND OF THE INVENTION

The invention relates to marine propulsion device transmissions, and, more particularly, to marine propulsion device ball clutch transmissions.

An example of a marine propulsion device ball clutch transmission is disclosed in U.S. Blanchard Pat. No. 4,395,240. Attention is also directed to the following U.S. Patents: Kling, U.S. Pat. No. 2,772,578, 12/04/56; Carr, U.S. Pat. No. 2,843,237, 04/15/58; Hiner U.S. Pat. 2,870,892, 01/27/59; Croisant, U.S. Pat. No. 3,931,783, 01/13/76; Croisant, U.S. Pat. No. 4,223,773, 08/23/80; Bankstahl, U.S. Pat. No. 4,244,454, 01/13/81; Linden, U.S. Pat. No. 4,510,816, 04/16/85; Nakahama, U.S. Pat. No. 4,527,441, 04/09/85; Iwashita, U.S. Pat. No. 4,570,776, 02/18/86; Iio, U.S. Pat. No. 4,579,204, 04/01/86.

SUMMARY OF THE INVENTION

The invention provides a marine propulsion device comprising a lower unit including a propeller shaft supported for rotary movement, the propeller shaft including an axial bore defining an annular wall having therethrough a radially extending aperture communicating with the bore, a propulsion element fixed on the propeller shaft for common rotation therewith, a bevel gear mounted in the lower unit generally coaxially with the propeller shaft for rotation relative to the propeller shaft, the gear including an axial passage through which the shaft extends and which has an inner surface axially overlapping the aperture and having thereon a surface portion extending radially inwardly, a ball which is located in the aperture and which is movable radially outwardly to be engaged by the surface portion, an actuator extending in the axial bore in the shaft and being movable relative to a drive position, the actuator including means for selectively engaging the ball to establish a drive condition, the means comprising, on the actuator, an actuator portion located such that, when the actuator is in the drive position, the actuator portion is axially aligned with the aperture and engages the ball to force the ball radially outwardly relative to the aperture so that the ball is engaged by the surface portion to establish rotary drive of the shaft by the gear, and means for preventing the actuator from becoming retained in the drive position.

The invention also provides a marine propulsion device comprising a lower unit including a propeller shaft supported for rotary movement, the propeller shaft including an axial bore defining an annular wall having therethrough a radially extending aperture communicating with the bore, a propulsion element fixed on the propeller shaft for common rotation therewith, a bevel gear mounted in the lower unit generally coaxially with the propeller shaft for rotation relative to the propeller shaft, the gear having therein an axial passage through which the shaft extends and which has an inner surface axially overlapping the aperture and having thereon a surface portion extending radially inwardly, and the gear including a main portion adapted to be rotatably driven by a driving means, and a driving portion having thereon the surface portion and being made of a wear-resistant material, a ball which is located in the aperture and which is movable radially outwardly to be engaged by the surface portion, and an actuator extending in the axial bore in the shaft and being movable relative to a drive position, the actuator including means for selectively engaging the ball to establish a drive condition, the means comprising, on the actuator, an actuator portion located such that, when the actuator is in the drive position, the actuator portion is axially aligned with the aperture and engages the ball to force the ball radially outwardly relative to the aperture so that the ball is engaged by the surface portion to establish rotary drive of the shaft by the gear.

The invention also provides a marine propulsion device comprising a lower unit including a propeller shaft supported for rotary movement, the propeller shaft including an axial bore defining an annular wall having therethrough a radially extending aperture communicating with the bore, a propulsion element fixed on the propeller shaft for common rotation therewith, a ball which is located in the aperture and which is movable partially and radially outwardly of the aperture, a bevel gear mounted in the lower unit generally coaxially with the propeller shaft for rotation relative to the propeller shaft, the gear including an axial passage through which the shaft extends and which has an inner surface axially overlapping the aperture and including a generally planar surface portion which extends radially inwardly, and which engages the ball when the ball extends outwardly of the aperture, and an actuator extending in the axial bore in the shaft and being movable relative to a drive position, the actuator including means for selectively engaging the ball to establish a drive condition, the means comprising, on the actuator, an actuator portion located such that, when the actuator is in the drive position, the actuator portion is axially aligned with the aperture and engages the ball to force the ball radially outwardly relative to the aperture so that the ball is engaged by the surface portion to establish rotary drive of the shaft by the gear.

The invention also provides a marine propulsion device comprising a lower unit including a propeller shaft supported for rotary movement, the propeller shaft including an axial bore defining an annular wall having therethrough a radially extending aperture communicating with the bore, a propulsion element fixed on the propeller shaft for common rotation therewith, a ball which is located in the aperture and which is movable partially and radially outwardly of the aperture, a bevel gear mounted in the lower unit generally coaxially with the shaft for rotation relative to the shaft, the gear including an axial passage through which the shaft extends and which has an inner surface axially overlapping the aperture and having thereon a surface portion extending radially inwardly, the surface portion including a radially innermost portion, an actuator extending in the axial bore in the shaft and being movable between axially spaced drive and neutral positions, the actuator having a longitudinal axis and including means for selectively engaging the ball to establish drive and neutral conditions, the means comprising, on the actuator, an actuator portion located such that, when the actuator is in the drive position, the actuator portion is axially aligned with the aperture and engages the ball to force the ball radially outwardly of the aperture so that the ball is engaged by the surface portion to establish rotary drive of the shaft by the gear, cam means engageable with the actuator for selectively moving the actuator from the neutral position to the drive position, the cam means being movable to a first position wherein the actuator is in the neutral position, to a second position wherein the actuator is in the drive position, to a first intermediate position located between the first position and the second position and wherein engagement of the actuator with the ball causes the ball to be tangentially aligned with the radially innermost portion, and to a second intermediate position located between the first intermediate position and the second position and wherein the actuator portion extends tangentially relative to the ball, the cam means including a surface which engages the actuator and which is shaped such that the angle formed by the axis and a line perpendicular to the surface at the point of contact between the surface and the actuator is approximately forty-seven degrees when the cam means is between the first position and the first intermediate position, decreases from approximately forty-seven degrees to approximately twenty degrees when the cam means is between the first intermediate position and the second intermediate position, and decreases from approximately twenty degrees to approximately zero degrees when the cam means is between the second intermediate position and the second position, and means for moving the actuator from the drive position to the neutral position.

The invention also provides a marine propulsion device comprising a lower unit including a propeller shaft supported for rotary movement, the propeller shaft including an axial bore defining an annular wall having therethrough an aperture communicating with the bore, the aperture having a radially extending axis, a propulsion element fixed on the propeller shaft for common rotation therewith, a bevel gear mounted in the lower unit generally coaxially with the shaft for rotation relative to the shaft, the gear including an axial passage through which the shaft extends and which has an inner surface axially overlapping the aperture and having thereon a surface portion extending radially inwardly, a ball which is located in the aperture and which is movable radially outwardly to be engaged by the surface portion, an actuator extending in the axial bore in the shaft and being movable relative to a drive position, the actuator including a main portion having therein an axial bore, and means for selectively engaging the ball to establish a drive condition, the means comprising an axially extending groove in the main portion, the groove communicating with the axial bore in the main portion, and the groove including a groove portion located such that, when the actuator is in the drive position, the groove portion is axially aligned with the aperture and engages the ball to force the ball radially outwardly relative to the aperture so that the ball is engaged by the surface portion to establish rotary drive of the shaft by the gear, and the actuator also including an end portion extending in the axial bore in the main portion so as to permit rotation of the main portion relative to the end portion, and cam means engageable with the end portion of the actuator for moving the actuator relative to the drive position.

The invention also provides a marine propulsion device comprising a lower unit including a propeller shaft supported for rotary movement, the propeller shaft including an axial bore defining an annular wall having therethrough axially aligned, diametrically spaced first and second radially extending apertures communicating with the bore, a propulsion element fixed on the propeller shaft for common rotation therewith, first and second balls which are respectively located in the first and second apertures and which are movable partially and radially outwardly of the apertures, a bevel gear mounted in the lower unit generally coaxially with the propeller shaft for rotation relative to the propeller shaft, the gear including an axial passage through which the shaft extends and which has an inner surface axially overlapping with the apertures and having thereon first and second diametrically spaced lobes, the lobes having thereon respective first and second surface portions extending radially inwardly, the first and second surface portions respectively engaging the first and second balls when the balls extend outwardly of the apertures, the lobes each having an arcuate extent of less than forty-five degrees, and the lobes having therebetween receiving spaces each having an arcuate extent of greater than 135 degrees, and an actuator extending in the axial bore in the shaft and being movable relative to a drive position, the actuator including means for selectively engaging the balls to establish a drive condition, the means comprising, on the actuator, an actuator portion located such that, when the actuator is in the drive position, the actuator portion is axially aligned with the apertures and engages the balls to force the balls radially outwardly relative to the apertures so that the balls are engaged by the surface portions to establish rotary drive of the shaft by the gear.

A principal feature of the invention is the provision of a ball clutch transmission that works better than prior transmissions, that is more durable than prior transmissions, and that has a better "feel" than prior transmissions.

Another principal feature of the invention is the provision of a ball clutch transmission including means for preventing the actuator from becoming retained in the drive position. Preferably, this preventing means includes, in the actuator, a sloping section which results in forces biasing the actuator toward the neutral position. Thus, when restraint is removed, the actuator will be urged to follow the cam or linkage toward the neutral position rather than remaining in the drive position.

Another principal feature of the invention is the provision of a ball clutch transmission with a driven bevel gear including a main, driven portion, and a driving portion made of a wear-resistant material.

Another principal feature of the invention is the provision of a ball clutch transmission wherein the driven bevel gears include planar surfaces, as described above, which engage the balls. Each surface intersects a plane which extends radially of the propeller shaft axis and through the center of the associated ball to form an angle of approximately 52°. This arrangement has been found to optimally apportion the contact loads between the actuator and the balls, between the gears and the balls, and between the balls and the propeller shaft.

Another principal feature of the invention is the provision of a ball clutch transmission including a cam shaped as described above. This cam shape has been found to provide the best transmission performance, durability and "feel."

Another principal feature of the invention is the provision of a ball clutch transmission including a two-piece actuator. The actuator includes a main portion having therein an axial bore, and an end portion extending in the axial bore so as to permit rotation of the main portion relative to the end portion, and so that axial movement of the end portion causes axial movement of the main portion of the actuator. The groove is located in the main portion and communicates with the end of the axial bore to improve lubrication at the interface of the end portion and the main portion and to facilitate rotation of the main portion relative to the end portion.

Another principal feature of the invention is the provision of a ball clutch transmission with a gear having a driving portion including a number of spaced lobes having a total arcuate extent of less than 90° and having therebetween arcuate receiving spaces having a total arcuate extent of greater than 270°. This minimizes the resistance to radially outward movement of the balls before the lobes come into driving engagement with the balls.

Other features and advantages of the invention will become apparent to those skilled in the art upon review of the following detailed description, claims and drawings.

DESCRIPTION OF THE DRAWINGS

FIG. 1 is a side elevation view of a marine propulsion device embodying the invention.

FIG. 2 is a vertical cross sectional view of the ball clutch transmission of the marine propulsion device.

FIG. 3 is a cross sectional view taken along line 3—3 in FIG. 2.

FIG. 4 is a view similar to FIG. 3 but showing the balls contacting the radially innermost portions of the ball-engaging surface portions of the bevel gear.

FIG. 5 is a top view of the cam.

FIG. 6 is a vertical cross sectional view of the actuator of the transmission.

FIG. 7 is a top view of the actuator.

FIGS. 10—13 are partially cross sectional views showing the interaction between the actuator, a ball, and a bevel gear. FIGS. 11 and 13 show the balls in the positions shown in FIGS. 4 and 3, respectively.

FIG. 14 is a view similar to FIGS. 3 and 4 but showing the balls in the position shown in FIG. 12.

Figure 8:
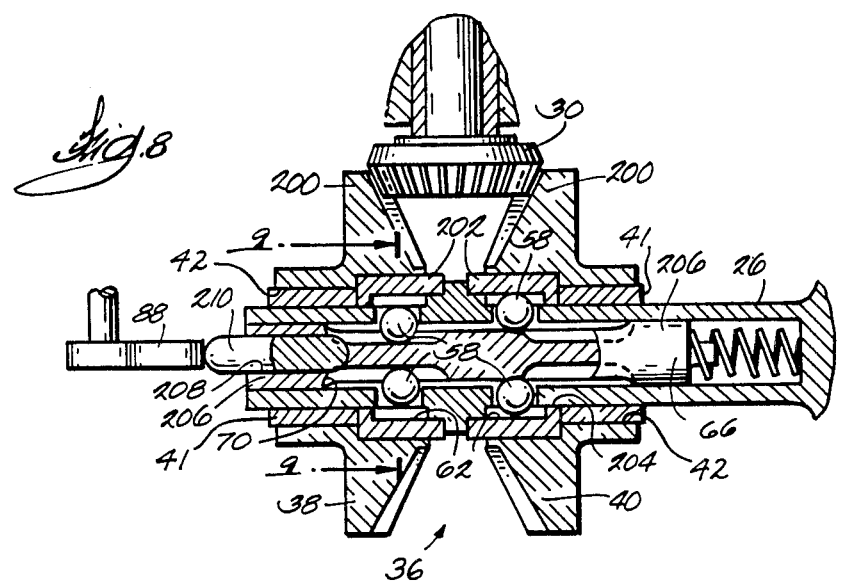
FIG. 8 is a vertical cross sectional view of a ball clutch transmission which is an alternative embodiment of the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A marine propulsion device 10 embodying the invention is illustrated in the drawings. As shown in FIG. 1, the marine propulsion device 10 comprises a mounting assembly mounted on the transom 12 of a boat. While various suitable mounting assemblies can be used, in the preferred embodiment, the mounting assembly includes a transom bracket 14 fixedly mounted on the transom 12, and a swivel bracket 16 mounted on the transom bracket 14 for pivotal movement relative thereto about a generally horizontal tilt axis 18.

The marine propulsion device 10 also comprises a propulsion unit 20 mounted on the swivel bracket 16 for pivotal movement relative thereto about a generally vertical steering axis 22, and for common movement therewith about the tilt axis 18. The propulsion unit 20 includes a lower unit 24 which supports a propeller shaft 26 (FIG. 2) having thereon a propeller 28 for rotary movement relative to the lower unit 24, and which also supports a driving bevel gear 30 for rotary movement about a generally vertical axis. The propulsion unit 20 also includes an engine 32 drivingly connected to the driving bevel gear 30 by a conventional drive train 34 (partially shown).

The marine propulsion device 10 also comprises a transmission 36 for selectively drivingly connecting and disconnecting the driving bevel gear 30 to the propeller shaft 26. In the preferred embodiment, the transmission 36 is a reversible ball clutch transmission and has forward drive, neutral, and rearward drive conditions. An example of such a transmission is disclosed in U.S. Blanchard Patent No. 4,395,240, which is incorporated herein by reference. It should be understood that in alternative embodiments the transmission 36 can have only a neutral condition and a single drive condition.

As shown in FIG. 2, the transmission 36 includes a pair of axially spaced, facing, driven bevel gears 38 and 40 supported generally coaxially with the propeller shaft 26 for rotation relative to the lower unit 24 and to the propeller shaft 26 and against axial movement relative to the lower unit 24 and to the propeller shaft 26. The gears 38 and 40 are supported within the lower unit 24 by any suitable bearing means (not shown).

Each of the driven bevel gears 38 and 40 includes an axial passage 42 which is divided into two parts, one part having a bearing means 41 for supporting the gear on the propeller shaft 26, and the other part having an inner surface 43 (FIGS. 3 and 4) for the selective drive of the propeller shaft 26. Each of the gears 38 and 40 is in meshing engagement with the driving bevel gear 30 so that when the engine 32 is running the gears 38 and 40 are constantly rotating, but in opposite directions.

The transmission 36 also includes, in the propeller shaft 26, an axial bore 44 which extends from the forward end of the propeller shaft 26 and which defines an annular wall 46 of the propeller shaft 26, which annular wall 46 has a uniform radial thickness. In the preferred embodiment, the bore 44 is a blind hole having an end wall 49. The annular wall 46 of the propeller shaft 26 includes axially spaced forward and rearward series 48 and 50, respectively, of circumferentially spaced, cylindrical apertures 52 having radially extending axes and communicating with the axial bore 44. The aperture series 48 and 50 respectively correspond to the driven bevel gears 38 and 40. In the preferred embodiment, each of the aperture series 48 and 50 includes two diametrically opposed apertures 52. In alternative embodiments, each of the series can include fewer or more than two apertures 52, and each gear can have more than one associated series of apertures 52.

The transmission 36 also includes forward and rearward series 54 and 56 of balls 58 respectively located in the forward and rearward series 48 and 50 of apertures 52. Each of the balls 58 has a diameter which is less than the diameter of the apertures 52, and which is greater than the radial thickness of the annular wall 46. The apertures 52 accommodate radial movement of the balls 58 into and out of engagement by the bevel gears 38 and 40 as described below.

The transmission 36 further includes (see FIG. 3) the inner surface 43 of the rearward bevel gear 40, which inner surface 43 axially overlaps with the rearward series 50 of apertures 52 in the propeller shaft 26. The inner surface 43 of gear 40 includes radially outermost curved surface portions 62 and a series 64 of circumferentially spaced and inwardly projecting lobe portions 87. The transmission 36 also includes the inner surface 43 of the forward bevel gear 38, which inner surface 43 axially overlaps with the forward series 48 of apertures 52 in the propeller shaft 26. The inner surface 43 of gear 38 includes radially outermost curved surface portions 62 and a series 60 of circumferentially spaced and inwardly projecting lobe portions 87.

In both the forward gear 38 and the rearward gear 40, the outermost curved surface portions or inside cylindrical segments 62 and the adjoining inwardly projecting lobes 87, that axially overlap the propeller shaft 26, form arcuate or partially annular ball receiving spaces 63. The lobes 87 include radially innermost curved surface portions 86 and leading ball drive surface portions 82. Each of the series 60 and 64 of lobes 87 includes a number of lobes 87 equal to or a multiple of the number of apertures 52 in the associated series 48 and 50 of apertures 52.

It has previously bee thought that the best driving engagement between a bevel gear and a ball was achieved by providing in the gear a socket which receives the ball and which has a depressed spherical contour. A disadvantage of this arrangement is that, due to manufacturing tolerances, the socket may not be properly located for optimal driving engagement with the ball. It has now been determined that better overall transmission performance is achieved by providing the gear with a planar surface which engages the ball. The planar surface will eventually deform to have an indentation which is properly located and of the proper size for engaging the ball. Therefore, in the preferred embodiment, each ball driving surface portion 82 is generally planar or flat (see FIGS. 3 and 4).

Thus, each of the balls 58 is movable partially outwardly of an associated aperture 52 of propeller shaft 26 and partially into a receiving space 63 of an associated gear 38 or 40 to be engaged by an associated flat surface portion 82. Each of the flat surface portions 82 is disposed such that it engages an associated ball 58 and causes driving engagement of the propeller shaft 26 by the associated gear 38 or 40.

In the preferred embodiment, each of the lobe series 60 and 64 includes a number of spaced lobes 87 having a total or aggregate arcuate extent of less than 90° and having therebetween ball receiving spaces 63 having a total arcuate extent of greater than 270°. In the illustrated construction, each of the lobe series 60 and 64 includes two diametrically opposed lobes 87. Each lobe 87 has an arcuate extent of less than 45° and each ball than 135°. Because of the longer arcuate extent of the spaces 63, a ball 58 moving outwardly of an aperture 52 is more likely to move into one of the spaces 63 between the lobes 87 than to come into contact with the innermost curved surface portion 86 of a lobe 87. Accordingly, there is minimal resistance to radially outward movement of any ball 58 before it becomes drivingly engaged by the flat surface portion 82 of a lobe 87.

It should be understood that while in the illustrated construction the forward bevel gear 38 is the forward drive gear and the rearward bevel gear 40 is the rearward or reverse drive gear, in alternative embodiments, the marine propulsion device 10 can have counter-rotating propellers, i.e., the forward bevel gear 38 can be the reverse drive gear and the rearward bevel gear 40 can be the forward drive gear.

The transmission 36 also includes (see FIGS. 2, 6 and 7) an actuator 66 which extends within the axial bore 44 in the propeller shaft 26 and which has a forward end 68 projecting from the forward end of the propeller shaft 26. In the preferred embodiment, the forward end 68 of the actuator 66 is conical and has a blunted apex with a spherical radius. The forward end 68 of the actuator 66 is engageable with cam means that is movable between forward, neutral, and rearward positions for moving or pushing the actuator 66 rearwardly to shift the transmission 36 from forward to neutral and from neutral to reverse. While various suitable cam means can be used, in the preferred embodiment, the cam means includes (see FIGS. 2 and 5) a cam 88 mounted in the lower unit 24 for pivotal movement about a generally vertical axis 90. The cam 88 can be rotated by any suitable means (not shown) and is preferably rotated in response to operator actuation of a shift lever 92 (FIG. 1). The cam 88 includes a surface 94 which engages the forward end 68 of the actuator 66.

The cam surface 94 has thereon (see FIG. 5) a forward point 96 which engages the actuator 66 when the cam 88 is in the forward position, a neutral point 98 which engages the actuator 66 when the cam 88 is in the neutral position, and a rearward point 100 which engages the actuator 66 when the cam 88 is in the rearward position.

In order to make the actuator 66 follow the cam surface 94 as the cam 88 is rotated to shift the transmission 36 from reverse to neutral and from neutral to forward, the transmission 36 further includes (see FIG. 2) spring means engageable with the actuator 66 for biasing the actuator 66 from the rearward drive position toward the forward drive position so as to remain engaged with the cam surface 94. While various suitable spring means can be employed, in the preferred embodiment, the spring means includes a compression spring 106 located within the axial bore 44 in the propeller shift 26 and between the actuator 66 and the end wall 49 of the bore 44. Thus, the actuator 66 is urged by the spring 106 to follow the cam surface 94 from the rearward drive position toward the forward drive position.

The actuator 66 also includes means for selectively and alternatively engaging the forward and rearward series 54 and 56 of balls 58 to establish forward drive and reverse drive conditions. This means includes, in the actuator 66, a series of angularly spaced, axially extending grooves 70 which are equal in number to the number of apertures 52 in each of the series 48 and 50 of apertures 52 and which are circumferentially aligned with the apertures 52. Circumferential alignment of the grooves 70 of the actuator 66 with the apertures 52 of the propeller shaft 26 is controlled by the balls 58. The proper relative sizing of the balls 58, the apertures 52, the diameter of the outermost curved surface portions 62 of the gears and the shape and location of the grooves 70 limit rotation of the actuator 66.

As shown in FIGS. 6 and 7, the grooves 70 are substantially identical and each includes a shallow central portion 72 connected by a ramp portion 79 to a forward deep end portion 78 and by a ramp portion 81 to a rearward deep end portion 80.

Each of the deep end portions 78 and 80 has a concave cross section transverse to the axis of the actuator 66 with a contour of such dimension as to permit receipt therein of a portion of an associated ball 58. When the deep end portions 78 or 80 are axially aligned with one of the apertures 52, the associated ball 58 can be displaced radially inwardly relative to the aperture 52. Such inward radial displacement locates a portion of the ball 58 within the deep end portion 78 or 80, and within the propeller shaft 26, and out of driving engagement by the associated bevel gear 38 or 40.

Each of the ramp portions 79 and 81 is angled with respect to the longitudinal axis of the actuator 66 to cam an associated ball 58 outwardly of the deep end portions 78 and 80 and onto the shallow central portion 72. The ramp portions 79 and 81 are axially spaced a distance less than the axial spacing of the series 48 and 50 of apertures 52.

The shallow central portion 72 has a concave cross section transverse to the axis of the actuator 66 with at least a part of the concavity having a radius substantially equal to that of the balls 58. When the shallow central portion 72 is axially aligned with one of the apertures 52, the associated ball 58 is displaced radially outwardly relative to the aperture 52. Such outward radial displacement locates a portion of the ball 58 outwardly of the propeller shaft 26 and into the ball receiving space 63 to be contacted by a flat surface portion 82 for driving engagement by the associated bevel gear 38 or 40. As explained in the above-incorporated Blanchard patent, because of the common radius of the ball 58 and the part of the shallow central portion 72 of the groove 70, force transmission between the ball 58 and the shallow central portion 72 of the groove 70 takes place along an expanded line rather than at an expanded point. This provides lower unit pressures and less wear.

In order to optimally apportion the contact loads between the shallow central portion 72 of the actuator 66 and a ball 58, between the flat surface portion 82 of a driven bevel gear 38 or 40 and a ball 58, and between a ball 58 and the cylindrical wall of an aperture 52 of the propeller shaft 26, the surface portion 82 is oriented so as to intersect a plane 84 (FIG. 3), which extends radially of axis of the propeller shaft 26 and through the center of the ball 58, to form an angle "X" of between 50° and 55°, and preferably approximately 52°. In other words, a line perpendicular to the surface portion 82 and extending through the point of contact between the surface portion 82 and the ball 58 intersects the plane 84 to form an angle "Y" of between 35° and 40°, and preferably approximately 38°.

In operation, when the cam 88 is rotated from the neutral position to the forward position, the spring 106 moves the actuator 66 forwardly to engage the forward point 96 on the cam surface 94 which locates the actuator 66 in the forward drive position. Therefore, the shallow central portions 72 of the grooves 70 are located in axial alignment with the forward series 48 of apertures 52.

Thus, the forward ramp portions 79 of the grooves 70 have cammed the forward series 54 of balls 58 radially outward and onto the shallow central portions 72 to maintain outward partial displacement of the balls 58 within the receiving spaces 63 to be contacted by the surface portions 82 in the forward bevel gear 38, thereby providing driving engagement of the propeller shaft by the gear 38. At the same time, the balls 58 in the rearward series 50 of apertures 52 remain located in the rearward deep end portions 80 of the grooves 70, so that there is no rotary drive of the propeller shaft by the rearward bevel gear 40.

When the cam 88 is rotated from the forward position to the neutral position, the cam surface 94 moves the actuator 66 rearwardly against the spring 106 until the actuator 66 engages the neutral point 98 of the cam surface 94, which locates the actuator 66 in the neutral position. Therefore, the forward and rearward deep end portions 78 and 80 of the grooves 70 are respectively axially aligned with the forward and rearward series 48 and 50 of apertures 52. At this alignment, the flat surface portions 82 of the rotating gears 38 and 40 have cammed the balls 58 radially inward and into the deep end portions 78 and 80 so that there is no rotary drive of the propeller shaft by either of the bevel gears 38 and 40.

When the cam 88 is rotated from the neutral position to the rearward drive position, the cam surface 94 moves the actuator 66 rearwardly against the spring 106 until the actuator 66 engages the rearward point 100 of the cam surface 94, which locates the actuator 66 in the rearward drive position (FIG. 2). Therefore, the shallow central portion 72 of the grooves 70 are located in axial alignment with the rearward series 50 of apertures 52. Thus, the rearward ramp portions 81 of the grooves 70 have cammed the rearward series 56 of balls 58 radially outward and onto the shallow central portions 72 to maintain outward partial displacement of the balls 58 within the receiving spaces 63 to be contacted by the surface portions 82 in the rearward bevel gear 40, thereby providing driving engagement of the propeller shaft 26 by the gear 40. At the same time, the balls 58 in the forward series 48 of apertures 52 remain located in the forward deep end portions 78 of the grooves 70, so that there is no rotary drive of the propeller shaft 26 by the forward bevel gear 38.

When the cam 88 is rotated from the rearward position to the neutral position, the spring 106 moves the actuator 66 forwardly to engage the neutral point 98 of the cam surface 94, which locates the actuator 66 in the neutral position. Therefore, the forward and rearward deep end portions 78 and 80 of the grooves 70 are respectively axially aligned with the forward and rearward series 48 and 50 of apertures 52. At this alignment, the flat surface portions 82 of the rotating gears 38 and 40 have cammed the balls radially inward and into the deep end portions 78 and 80, so that there is no rotary drive of the propeller shaft by either of the bevel gears 38 and 40.

In the embodiment as thus far described, when the actuator 66 is drivingly engaged in the rearward drive position, and the cam 88 is rotated from the rearward position to the neutral position, it is possible for the resisting force (due to friction between the rearward balls 58 and the actuator 66) to be greater than the applied force of the compression spring 106. This could have the undesirable effect of retaining the actuator 66 in the rearward drive position by preventing the actuator 66 from following the cam surface 94 when the cam 88 is rotated from the rearward position toward the neutral position. Therefore, in the preferred embodiment, the transmission 36 also includes means for preventing the actuator 66 from becoming retained in the rearward drive position, or for assisting movement of the actuator 66 out of the rearward drive position. While various suitable means can be used, in the illustrated construction, the preventing or assisting means includes (see FIGS. 6, 7 and 10–13), on the shallow central portions 72 of the grooves 70, a section 108 which is located adjacent the rearward ramp portion 81 of each groove 70 and which slopes radially inwardly and toward the rearward deep end portion 80. This sloping section 108 is located so that, when the actuator 66 is in the rearward drive position (FIG. 13), the sloping section 108 engages an associated ball 58. The radially inward force exerted on the sloping section 108 by the associated ball 58 has a component which biases the actuator 66 forwardly or toward the neutral position. Thus, the forces exerted by the balls 58 on the sloping sections 108 of the grooves 70 will assist in moving an unopposed actuator 66 to the neutral position.

Further, the sloping sections 108 used in tandem with spring 106 make it possible to employ spring means of lower force, which considerably enhances the smoothness or "feel" of the transmission shift function whenever the actuator 66 is moved rearwardly, and also results in reduced component wear.

It should be understood that such means for assisting movement of the actuator 66 can also be used with transmissions having linkages for pulling and pushing the actuator 66 forwardly and rearwardly rather than having cam and spring arrangements.

In the preferred embodiment, the cam 88 has a shape which improves operation of the transmission 36 and which improves the "feel" of the transmission 36 to the operator. As an example, the shape of the cam surface 94 between the neutral point 98 and the rearward point 100 will be discussed.

In addition to the neutral point 98 and the rearward point 100, the cam surface 94 also includes (see FIG. 5) a first intermediate point 102 which engages the actuator 66 when the cam 88 is in a first intermediate position between the neutral position and the rearward position, and a second intermediate point 104 which engages the actuator 66 when the cam 88 is in a second intermediate position between the first intermediate position and the rearward position. In FIG. 5, the actuator 66 is shown engaging the surface 94 between the first intermediate point 102 and the second intermediate point 104.

The angle "Z" (see FIG. 5) between the longitudinal axis of the actuator 66 and a line perpendicular to the cam surface 94 at the point of contact between the cam surface 94 and the spherical radius of the forward end 68 of the actuator 66 determines the rate of axial displacement of the actuator 66 relative to the rotational rate of displacement of the cam 88, and also determines the apportionment of lateral and axial components acting on the actuator 66 as a result of the input force imposed by cam 88.

In other words, in operation, the greater the angle Z, the greater the linear speed of the actuator 66, and so too the greater the lateral force on the actuator 66 in addition to a longitudinal force.

When the cam 88 is rotated to move the actuator 66 from the neutral point 98 to the first intermediate point 102 of the cam surface 94, a large angle Z is desirable. Although the increase in lateral force exerted on the actuator 66 increases the frictional resistance between the actuator 66 and the bore 44 of the propeller shaft 26, the resistance is tolerable because in this range the only other resistance to rearward axial movement of the actuator 66 is from the spring 106. In addition, the faster axial movement of the actuator 66 moves the balls 58 outwardly and into the receiving spaces 63 with a minimal amount of cam 88 rotation. A large angle Z also causes the operator to apply more starting force to move the shift lever 92, which tends to encourage a quicker follow up movement of the shift lever 92, and results in a better "feel."

When the cam 88 has been rotated from the neutral position 98 to locate the actuator 66 at the first intermediate point 102 of the cam surface 94, the rearward balls 58 may come into first tangential contact with the radially innermost curved surface portions 86 of lobes 87 of the rearward bevel gear 40, which may resist further shift effort. However, actual first contact of the balls 58 with the innermost curved surface portions 86 will most often occur when the balls 58 are on the ramp surfaces 81 (see FIG. 11), and prior to cresting onto portions 108 of actuator 66, and when the actuator 66 is in contact with the cam surface 94 at a location between the first intermediate point 102 and the second intermediate point 104. (As shown in FIG. 12, cresting occurs when the radius (R) of the ball 58 extends through the first point of contact, and is perpendicular with either the forward end of the shallow central portion 72 or the rearward end of sloping section 108). Therefore, between the first and second intermediate points 102 and 104 of cam surface 94, it is preferable to decrease angle Z and thereby increase the longitudinal force on the actuator 66.

When the cam 88 has been rotated from first intermediate point 102 to locate the actuator 66 at the second intermediate point 104 of the cam surface 94, when the rearward balls 58 have crested onto surface 108 of the actuator 66, and when the balls 58 have been engaged by the lobes 87 at the intersect of curved surface portions 86 and the flat surface portions 82 of gear 40, the increasing resistance makes it preferable to continue reducing angle Z and thereby continue to increase longitudinal forces on the actuator 66.

When the cam has been rotated from the second intermediate point 104 to locate the actuator 66 at the rearward point 100 of cam surface 94, the neutral to rearward shift is completed, and angle Z is near zero degrees.

Accordingly, in the preferred embodiment, the cam surface 94 is shaped such that the angle Z is approximately 47° between the neutral Point 98 and the first intermediate point 102, decreases from approximately 47° to approximately 20° between the first intermediate point 102 and the second intermediate point 104, and decreases from approximately 20° to approximately zero degrees between the second intermediate point 104 and the rearward point 100.

The shape of the cam surface 94 between the forward point 96 and the neutral point 98 is similar to the shape between the neutral point 98 and the rearward point 100, although the angle Z is slightly greater because the resistance of the spring 106 is less in this range, and the cam 88 is moving the actuator 66 out of drive and into neutral.

Figure 9:
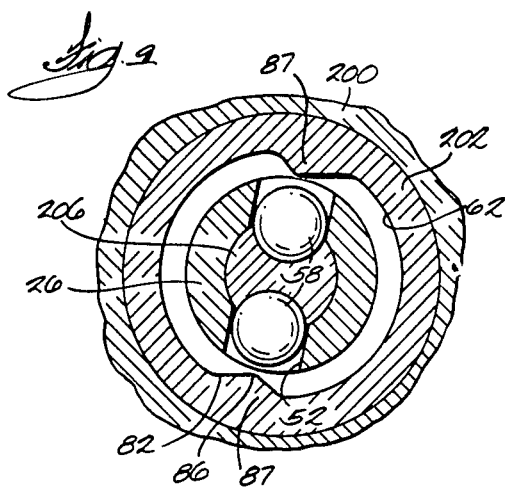
FIG. 9 is a cross sectional view taken along line 9—9 in FIG. 8.

An alternative embodiment of the invention is illustrated in FIGS. 8 and 9. In the alternative embodiment, in order to permit the use of one material for the driven portions of the bevel gears 38 and 40 and another material for the driving portions of the bevel gears 38 and 40, each of the bevel gears includes a main portion 200 which is rotatably driven by the driving gear 30, and a driving portion 202 which has thereon the associated surface portions 82. Preferably, the driving portion 202 is made of a wear-resistant material. Furthermore, the driving portion 202 is generally annular and includes an opening 204 which in most respects is the same as the previously described inner surface 43, which at least partially defines the axial passage 42 in the bevel gear, and which has therein the associated surface portions 82.

Also, in the alternative embodiment, in order to reduce wear on the cam surface 94, the actuator 66 includes a main portion 206 having therein an axial bore 208, and an end portion 210 extending in the axial bore 208 in the main portion 206 so as to permit rotation of the main portion 206 relative to the end portion 210. Furthermore, the grooves 70 are located in the main portion 206 and communicate with the end of the axial bore 208 to improve lubrication at the interface of the end portion 210 and the main portion 206 and to facilitate rotation of the main portion 206 relative to the end portion 210. Accordingly, while the main portion 206 of the actuator 66 rotates with the propeller shaft 26, the end portion 210 remains relatively stationary and therefore does not cause significant wear on the cam surface 94.

Various features of the invention are set forth in the following claims.

We claim:

1. A marine propulsion device comprising a lower unit including a propeller shaft supported for rotary movement, said propeller shaft including an axial bore defining an annular wall having therethrough a radially extending aperture communicating with said bore, a bevel gear mounted in said lower unit generally coaxially with said propeller shaft for rotation relative to said propeller shaft, said gear including an axial passage through which said shaft extends and which has an inner surface axially overlapping said aperture and having thereon a surface portion extending radially inwardly, a ball which is located in said aperture and which is movable radially outwardly to be engaged by said surface portion, an actuator extending in said axial bore in said shaft and being movable relative to a drive position, said actuator including means for selectively engaging said ball to establish a drive condition, said means comprising, in said actuator, an actuator portion located such that, when said actuator is in said drive position, said actuator portion is axially aligned with said aperture and engages said ball to force said ball radially outwardly relative to said aperture so that said ball is engaged by said surface portion to establish rotary drive of said shaft by said gear, and means for assisting movement of said actuator out of said drive position.

2. A marine propulsion device comprising a lower unit including a propeller shaft supported for rotary movement relative to said lower unit, said propeller shaft including an axial bore defining an annular wall having therethrough a radially extending aperture communicating with said bore, a bevel gear mounted in said lower unit generally coaxially with said propeller shaft for rotation relative to said lower unit and to said propeller shaft said gear including an axial passage through which said shaft extends and which has an inner surface axially overlapping with said aperture and having thereon a surface portion extending radially inwardly, a ball which is located in said aperture and which is movable radially outwardly to be engaged by said surface portion, an actuator extending in said axial bore in said shaft and being movable between axially spaced drive and neutral positions, said actuator including means for selectively engaging said ball to establish drive and neutral conditions, said means comprising an axially extending groove in said actuator, said groove including a deep portion located such that, when said actuator is in said neutral position, said deep portion is axially aligned with said aperture and permits receipt of at least a portion of said ball in said deep portions so that said ball is not engaged by said surface portion, said groove also including a shallow portion located such that, when said actuator is in said drive position, said shallow portion is axially aligned with said aperture and engages said ball to force said ball radially outwardly relative to said aperture so that said ball is engaged by said surface portion to establish rotary drive of said shaft by said gear, and means assisting movement of said actuator out of said drive position.

3. A marine propulsion device as set forth in claim 2 wherein said assisting means includes, on said shallow portion, a section which slopes radially inwardly and toward said deep portion, whereby the force exerted on said section by said ball biases said actuator toward said neutral position.

4. A marine propulsion device as set forth in claim 3 wherein said groove also includes a ramp portion extending between said deep portion and said shallow portion, and wherein said sloping section is located adjacent said ramp portion.

5. A marine propulsion device as set forth in claim 2 wherein said gear includes a main portion adapted to be rotatably driven by a driving means, and a driving portion having thereon said surface portion, said driving portion being made of a wear-resistant material.

6. A marine propulsion device as set forth in claim 5 wherein said driving portion is generally annular and includes an opening which partially defines said axial passage and which has thereon said surface portion.

7. A marine propulsion device as set forth in claim 2 and further comprising cam means engageable with said actuator and movable from a first position to a second position for moving said actuator from one of said neutral position and said drive position to the other of said neutral position and said drive position, and spring mean engageable with said actuator for biasing said actuator from said other position to said one position, whereby said actuator moves from said other position to said one position under the influence of said spring means when said cam means moves from said second position to said first position.

8. A marine propulsion device as set forth in claim 2 wherein said surface portion is generally planar.

9. A marine propulsion device as set forth in claim 8 wherein said shaft has a longitudinal axis, and wherein said surface portion intersects a plane, which plane has therein said axis and the center of said ball, to form an angle of approximately fifty-two degrees.

10. A marine propulsion device as set forth in claim 2 wherein said actuator has a longitudinal axis, wherein said gear includes a radially innermost portion, and wherein said device further comprises cam means engageable with said actuator for selectively moving said actuator from said neutral position to said drive position, said cam means being movable to a first position wherein said actuator is in said neutral position, to a second position wherein said actuator is in said drive position, to a first intermediate position located between said first position and said second position and wherein engagement of said actuator with said ball causes said ball to be tangentially aligned with said radially innermost portion, and to a second intermediate position located between said first intermediate position and said second position and wherein said shallow portion extends tangentially relative to said ball, said cam means including a surface which engages said actuator and which is shaped such that the angle formed by said longitudinal axis and a line perpendicular to said surface at the point of contact between said surface and said actuator is approximately forty-seven degrees when said cam means is between said first position and said first intermediate position, decreases from approximately forty-seven degrees to approximately twenty degrees when said cam means is between said first intermediate position and said second intermediate position, and decreases from approximately twenty degrees to approximately zero degrees when said cam means is between said second intermediate position and said second position, and means for selectively moving said actuator from said drive position to said neutral position.

11. A marine propulsion device set forth in claim 2 wherein said actuator includes a main portion having therein an axial bore, wherein said groove is located in said main portion and communicates with said axial bore in said main portion, wherein said actuator also includes an end portion extending in said axial bore in said main portion so as to permit rotation of said main portion relative to said end portion, and so that axial movement of said end portion in the direction from said neutral position to said drive position causes movement of said main portion in said direction, and wherein said marine propulsion device further comprises cam means engageable with said end portion of said actuator and movable from a first position to a second position for selectively moving said actuator from said neutral position to said drive position, and means for selectively moving said actuator from said drive position to said neutral position.

12. A marine propulsion device comprising a lower unit including a propeller shaft supported for rotary movement relative to said lower unit, said propeller shaft including an axial bore defining an annular wall having therethrough a number of angularly spaced, radially extending apertures located in a plane extending perpendicular to the axis of said propeller shaft and communicating with said bore, a like-number of balls which are respectively located in said apertures and which are movable partially and radially outwardly of said apertures, a bevel gear mounted in said lower unit in generally coaxial relation to said propeller shaft for rotation relative to said lower unit and to said propeller shaft, said gear including an axial passage which receives said shaft and which has an inner surface axially overlapping said apertures and having thereon a like-number of spaced lobes having a total arcuate extent of greater than 270 degrees, said lobes having thereon respective surface portions extending radially inwardly and respectively engaging said balls when said balls extend outwardly of said apertures, an actuator extending in said axial bore in said shaft and being movable between axially spaced drive and neutral positions, said actuator including means for selectively engaging said balls to establish drive and neutral conditions, said means comprising a like-number of axially extending grooves in said actuator, said grooves each including a deep portion located such that, when said actuator is in said neutral position, said deep portions are aligned with said apertures and permit receipt of at least a portion of said balls in said deep portions so that said balls are not engaged by said surface portions, said grooves each also including a shallow portion located such that, when said actuator is in said drive position, said shallow portions are aligned with said apertures and engage said balls to force said balls radially outwardly relative to said apertures so that said balls are engaged by said surface portions to establish rotary drive of said shaft by said gear, and means for assisting movement of said actuator out of said drive position.

13. A marine propulsion device comprising a lower unit including a propeller shaft supported for rotary movement, said propeller shaft including an axial bore defining an annular wall having therethrough a radially extending aperture communicating with said bore, a bevel gear mounted in said lower unit generally coaxially with said propeller shaft for rotation relative to said propeller shaft, said bevel gear having therein an axial passage which receives said shaft and which has an inner surface axially overlapping said aperture and having thereon a surface portion extending radially inwardly, and said gear including a main portion adapted to be rotatably driven by a driving means, and a driving portion having thereon said surface portion and being made of a wear-resistant material, a ball which is located in said aperture and which is movable radially outwardly to be engaged by said surface portion, and an actuator extending in said axial bore in said shaft and being movable relative to a drive position, said actuator including means for selectively engaging said ball to establish a drive condition, said means comprising, in said actuator, an actuator portion located such that, when said actuator is in said drive position, said actuator portion is aligned with said aperture and engages said ball to force said ball radially outwardly relative to said aperture so that said ball is engaged by said surface portion to establish rotary drive of said shaft by said gear.

14. A marine propulsion device comprising a lower unit including a propeller shaft supported for rotary movement relative to said lower unit, said propeller shaft including an axial bore defining an annular wall having therethrough a radially extending aperture communicating with said bore, a bevel gear mounted in said lower unit generally coaxially with said propeller shaft for rotation relative to said lower unit and to said propeller shaft, said bevel gear having therein an axial passage which receives said shaft and which has an inner surface axially overlapping said aperture and having thereon a surface portion extending radially inwardly, and said gear including a main portion adapted to be rotatably driven by a driving means, and a driving portion having thereon said surface portion and being made of a wear-resistant material, a ball which is located in said aperture and which is movable radially outwardly to be engaged by said surface portion, and an actuator extending in said axial bore in said shaft and being movable between axially spaced drive and neutral positions, said actuator including means for selectively engaging said ball to establish drive and neutral conditions, said means comprising an axially extending groove in said actuator, said groove including a deep portion located such that, when said actuator is in said neutral position, said deep portion is aligned with said aperture and permits receipt of at least a portion of said ball in said deep portion so that said ball is not engaged by said surface portion, said groove also including a shallow portion located such that, when said actuator is in said drive position, said shallow portion is aligned with said aperture and engages said ball to force said ball radially outwardly relative to said aperture so that said ball is engaged by said surface portion to establish rotary drive of said shaft by said gear.

15. A marine propulsion device as set forth in claim 14 wherein said driving portion is generally annular and includes an opening which partially defines said axial passage and which has thereon said surface portion.

16. A marine propulsion device as set forth in claim 14 and further comprising cam means engageable with said actuator and movable from a first position to a second position for moving said actuator from one of said neutral position and said drive position to the other of said neutral position and said drive position, and spring means engageable with said actuator for biasing said actuator from said other position to said one position, whereby said actuator moves from said other position to said one position under the influence of said spring means when said cam means moves from said second position to said first position.

17. A marine propulsion device as set forth in claim 14 wherein said surface portion is generally planar.

18. A marine propulsion device as set forth in claim 17 wherein said shaft has a longitudinal axis, and wherein said surface portion intersects a place, which plane has therein said axis and the center of said ball, to form an angle of approximately fifty-two degrees.

19. A marine propulsion device as set forth in claim 14 wherein said actuator has a longitudinal axis, wherein said gear includes a radially innermost portion, and wherein said device further comprises cam means engageable with said actuator for selectively moving said actuator from said neutral position to said drive position, said cam means being movable to a first position wherein said actuator is in said neutral position, to a second position wherein said actuator is in said drive position, to a first intermediate position located between said first position and said second position and wherein engagement of said actuator with said ball causes said ball to be tangentially aligned with said radially innermost portion, and to a second intermediate position located between said first intermediate position and said second position and wherein said shallow portion extends tangentially relative to said ball, said cam means including a surface which engages said actuator and which is shaped such that the angle formed by said longitudinal axis and a line perpendicular to said surface at the point of contact between said surface and said actuator is approximately forty-seven degrees when said cam means is between said first position and said first intermediate position, decreases from approximately forty-seven degrees to approximately twenty degrees when said cam means is between said first intermediate position and said second intermediate position, and decreases from approximately twenty degrees to approximately zero degrees when said cam means is between said second intermediate position and said second position, and means for selectively moving said actuator from said drive position to said neutral position.

20. A marine propulsion device set forth in claim 14 wherein said actuator includes a main portion having therein an axial bore, wherein said groove is located in said main portion and communicates with said axial bore in said main portion, wherein said actuator also includes an end portion extending in said axial bore in said main portion so as to permit rotation of said main portion relative to said end portion, and so that axial movement of said end portion in the direction from said neutral position to said drive position causes movement of said main portion in said direction, and wherein said marine propulsion device further comprises cam means engageable with said end portion of said actuator and movable from a first position to a second position for selectively moving said actuator from said neutral position to said drive position, and means for selectively moving said actuator from said drive position to said neutral position.

21. A marine propulsion device comprising a lower unit including a propeller shaft supported for rotary movement relative to said lower unit, said propeller shaft including an axial bore defining an annular wall having angularly spaced, radially extending apertures located in a plane extending perpendicularly to the axis of said propeller shaft and communicating with said bore, a bevel gear mounted in said lower unit in generally coaxial relation to said propeller shaft for rotation relative to said lower unit and to said propeller shaft, said bevel gear having therein an axial passage which receives said shaft and which has an inner surface axially overlapping said apertures and having thereon a like-number of spaced lobes having a total arcuate extent of less than ninety degrees and having therebetween receiving spaces having a total arcuate extent of greater than 270 degrees, said lobes having thereon respective surface portions extending radially inwardly, and said gear including a main portion adapted to be rotatably driven by a driving means, and a driving portion having thereon said surface portions and being made of a wear-resistant material, a like-number of balls which are respectively located in said apertures and which are movable partially and radially outwardly of said apertures for engagement by said surface portions, and an actuator extending in said axial bore in said shaft and being movable between axially spaced drive and neutral positions, said actuator including means for selectively engaging said balls to establish drive and neutral conditions, said means comprising, in respective association with each of said balls, an axially extending groove in said actuator, said grooves each including a deep portion located such that, when said actuator is in said neutral position, each of said deep portions is respectively aligned with one of said apertures and permits receipt therein of at least a portion of the associated one said balls so that said one associated ball is not engaged by the associated one said surface portions, said grooves each also including a shallow portion located such that, when said actuator is in said drive position, each of said shallow portions is aligned with one of said apertures and engages the associated one of said balls to force said one associated ball radially outwardly thereof so that said balls are engaged by said surface portions to establish rotary drive of said shaft by said gear.

22. A marine propulsion device comprising a lower unit including a propeller shaft supported for rotary movement, said propeller shaft including an axial bore defining an annular wall having therethrough a radially extending aperture communicating with said bore, a ball which is located in said aperture and which is movable partially and radially outwardly of said aperture, a bevel gear mounted in said lower unit generally coaxially with said propeller shaft for rotation relative to said propeller shaft, said bevel gear including an axial passage which receives said shaft and which has an inner surface overlapping said aperture and including a generally planar surface portion which extends radially inwardly, and which engages said ball when said ball extends outwardly of said aperture, and an actuator extending in said axial bore in said shaft and being movable relative to a drive position, said actuator including means for selectively engaging said ball to establish a drive condition, said means comprising, in said actuator, an actuator portion located such that, when said actuator is in said drive position, said actuator portion is aligned with said aperture and engages said ball to force said ball radially outwardly relative to said aperture so that said ball is engaged by said surface portion to establish rotary drive of said shaft by said gear.

23. A marine propulsion device comprising a lower unit including a propeller shaft supported for rotary movement relative to said lower unit, said propeller shaft including an axial bore defining an annular wall having therethrough a radially extending aperture communicating with said bore, a ball which is located in said aperture and which is movable partially and radially outwardly of said aperture, a bevel gear mounted in said lower unit generally coaxially with said propeller shaft for rotation relative to said lower unit and to said propeller shaft, said bevel gear including an axial passage which receives said shaft and which has an inner surface axially overlapping said aperture and including a generally planar surface portion which extends radially inwardly and which engages said ball when said ball extends outwardly of said aperture, and an actuator extending in said axial bore in said shaft and being movable between axially spaced drive and neutral positions, said actuator including means for selectively engaging said ball to establish drive and neutral conditions, said means comprising an axially extending groove in said actuator, said groove including a deep portion located such that when said actuator is in said neutral position, said deep portion is aligned with said aperture and permits receipt of at least a portion of said ball in said deep portion so that said ball is not engaged by said surface portion, said groove also including a shallow portion located such that, when said actuator is in said drive position, said shallow portion is aligned with said aperture and engages said ball to force said ball radially outwardly relative to said aperture so that said ball is engaged by said surface portion to establish rotary drive of said shaft by said gear.

24. A marine propulsion device as set forth in claim 23 wherein said shaft has a longitudinal axis, and wherein said surface portion intersects a plane, which plane has therein said axis and the center of said ball, to form an angle of approximately fifty-two degrees.

25. A marine propulsion device as set forth in claim 23 wherein said actuator has a longitudinal axis, wherein said gear includes a radially innermost portion and wherein said device further comprises cam means engageable with said actuator for selectively moving said actuator from said neutral position to said drive position, said cam means being movable to a first position wherein said actuator is in said neutral position, to a second position wherein said actuator is in said drive position, to a first intermediate position located between said first position and said second position and wherein engagement of said actuator with said ball causes said ball to be tangentially aligned with said radially innermost portion, and to a second intermediate position located between said first intermediate position and said second position and wherein said shallow portion extends tangentially relative to said ball, said cam means including a surface which engages said actuator and which is shaped such that the angle formed by said longitudinal axis and a line perpendicular to said surface at the point of contact between said surface and said actuator is approximately forty-seven degrees when said cam means is between said first position and said first intermediate position, decreases from approximately forty-seven degrees to approximately twenty degrees when said cam means is between said first intermediate position and said second intermediate position, and decreases from approximately twenty degrees to approximately zero degrees when said cam means is between said second intermediate position and said second position, and means for selectively moving said actuator from said drive position to said neutral position.

26. A marine propulsion device set forth in claim 23 wherein said actuator includes a main portion having therein an axial bore, wherein said groove is located in said main portion and communicates with said axial bore in said main portion, wherein said actuator also includes an end portion extending in said axial bore in said main portion so as to permit rotation of said main portion relative to said end portion, and so that axial movement of said end portion in the direction from said neutral position to said drive position causes movement of said main portion in said direction, and wherein said marine propulsion device further comprises cam means engageable with said end portion of said actuator and movable from a first position to a second position for selectively moving said actuator from said neutral position to said drive position, and means for selectively moving said actuator from said drive position to said neutral position.

27. A marine propulsion device as set forth in claim 23 and further comprising cam means engageable with said actuator and movable from a first position to a second position for moving said actuator from one of said neutral position and said drive position to the other of said neutral position and said drive position, and spring means engageable with said actuator for biasing said actuator from said other position to said one position, whereby said actuator moves from said other position to said one position under the influence of said spring means when said cam means moves from said second position to said first position.

28. A marine propulsion device comprising a lower unit including a propeller shaft supported for rotary movement relative to said lower unit, said propeller shaft including an axial bore define an therethrough a number of angularly spaced, radially extending apertures located in a plane extending perpendicularly to the axis of said propeller shaft and communicating with said bore, a like-number of balls which are respectively located said apertures and which are movable partially and radially outwardly of said apertures, a bevel gear mounted in said lower unit in generally coaxial relation to said propeller shaft for rotation relative to said lower unit and to said propeller shaft, said bevel gear including an axial passage which receives said shaft and which has an inner surface axially overlapping said apertures and having thereon a like-number of spaced lobes having a total arcuate extent of less than ninety degrees and having therebetween receiving spaces having a total arcuate extent of greater than 270 degrees, said lobes having thereon respective planar surface portion extending radially inwardly and respectively engaging said balls when said balls extend outwardly of said apertures, and an actuator extending in said axial bore in said shaft and being movable between axially spaced drive and neutral positions, said actuator including means for selectively engaging said balls to establish drive and neutral conditions, said means comprising, in respective association with each of said balls, an axially extending groove in said actuator, said grooves each including a deep portion located such that, when said actuator is in said neutral position, said deep portions are aligned with said apertures and permit receipt therein of at least a portion of said balls so that said balls are not engaged by said surface portions, and said grooves each also including a shallow portion locate such that, when said actuator is in said drive position, said shallow portions are aligned with said apertures and engage said balls to force said balls radially outwardly relative to said apertures so that said balls are engaged by said surface portions to establish rotary drive of said shaft by said gear.

29. A marine propulsion device comprising a lower unit including a propeller shaft supported for rotary movement, said propeller shaft including an axial bore defining an annular wall having therethrough a radially extending aperture communicating with said bore, a ball which is located in said aperture and which is movable partially and radially outwardly of said aperture, a bevel gear mounted in said lower unit generally coaxially with said shaft for rotation relative to said shaft, said gear including an axial passage which receives said shaft and which has an inner surface axially overlapping said aperture and having thereon a surface portion extending radially inwardly, and said inner surface also having thereon a radially innermost portion, an actuator extending in said axial bore in said shaft and being movable between axially spaced drive and neutral positions, said actuator having a longitudinal axis and including means for selectively engaging said ball to establish drive and neutral conditions, said means comprising, in said actuator, an actuator portion located such that, when said actuator is in said drive position, said actuator portion is aligned with said aperture and engages said ball to force said ball radially outwardly of said aperture so that said ball is engaged by said surface portion to establish rotary drive of said shaft by said gear, and cam means engageable with said actuator for selectively moving said actuator from said neutral position to said drive position, said cam means being movable to a first position, to a second position wherein said actuator is in said drive position, to a first intermediate position located between said first position and said second deposition and wherein said actuator is located such that said ball is tangentially aligned with said radially innermost portion, and to a second intermediate position located between said first intermediate position and said second position and wherein said actuator portion extends tangentially relative to said ball, said cam means including a surface which engages said actuator and which is shaped such that the angle formed by said axis and a line perpendicular to said surface at the point of contact between said surface and said actuator is approximately forty-seven degrees when said cam means is between said first position and said first intermediate position, decreases from approximately forty-seven degrees to approximately twenty degrees when said cam means is between said first intermediate position and said second intermediate position, and decreases from approximately twenty degrees to approximately zero degrees when said cam means is between said second intermediate position and said second position, and means for selectively moving said actuator from said drive position to said neutral position.

30. A marine propulsion device comprising a lower unit including a propeller shaft supported for rotary movement relative to said lower unit, said propeller shaft including an axial bore defining an annular wall having therethrough a radially extending aperture communicating with said bore, a ball which is located in said aperture and which is movable partially and radially outwardly of said aperture, a bevel gear mounted in said lower unit generally coaxially with said shaft for rotation relative to said shaft, said gear including an axial passage which receives said shaft and which has an inner surface axially overlapping said aperture and having thereon a surface portion extending radially inwardly, and said inner surface also having thereon a radially innermost portion, an actuator extending in said axially spaced drive and neutral positions, said actuator having a longitudinal axis and including means for selectively engaging said ball to establish drive and neutral conditions, said means comprising an axially extending groove in said actuator, said groove including a shallow portion locate such that, when said actuator is in said drive position, said shallow portion is aligned with said aperture and engages said ball to force said ball radially outwardly of said aperture so that said ball is engaged by said surface portion to establish rotary drive of said shaft by said gear, said groove also including a deep portion located such that, when said actuator is in said neutral position, said deep portion is aligned with said aperture and permits receipt of at least a portion of said ball in said deep portion so that said ball is not engaged by said surface portion, and cam means engageable with said actuator for selectively moving said actuator from said neutral position to said drive position, said cam means being movable to a first position wherein said actuator is in said neutral position, to a second position wherein said actuator is in said drive position, to a first intermediate position located between said first position and said second position and wherein said actuator is located such that said ball is tangentially aligned with said radially innermost portion, and to a second intermediate position located between said first intermediate position said second position and wherein said shallow portion extends tangentially relative to said ball, said cam means including a surface which engages said actuator and which is shaped such that the angle formed by said axis and a line perpendicular to said surface at the point of contact between said surface and said actuator is approximately forty-seven degrees when said cam means is between said first position and said first intermediate position, decreases from approximately forty-seven degrees to approximately twenty degrees when said cam means is between said first intermediate position and said second intermediate position, and decreases from approximately twenty degrees to approximately zero degrees when said cam means is between said second intermediate position and said second position, and means for selectively moving said actuator from said drive position to said neutral position.

31. A marine propulsion device set forth in claim 30 wherein said actuator includes a main portion having therein an axial bore, wherein said groove is located in said main portion and communicates with said axial bore in said main portion, and wherein said actuator also includes an end portion extending in said axial bore in said main portion so as to permit rotation of said main portion relative to said end portion, and so that axial movement of said end portion in the direction from said neutral position to said drive position causes movement of said main portion in said direction.

32. A marine propulsion device as set forth in claim 30 and further comprising spring means engageable with said actuator for biasing said actuator from said drive position to said neutral position, whereby said actuator moves from said drive position to said neutral position under the influence of said spring means when said cam means is moved from said second position to said first position.

33. A marine propulsion device comprising a lower unit including a propeller shaft supported for rotary movement relative to said lower unit, said propeller shaft including an axial bore defining an annular wall having therethrough a number of angularly spaced, radially extending apertures located in a plane extending perpendicularly to the axis of said propeller shaft and communicating with said bore, a like-number of balls which are respectively located in said apertures and which are movable partially nd radially outwardly of said apertures, a bevel gear mounted in said lower unit generally coaxially with said shaft for rotation relative to said shaft, said gear including an axial passage through which said shaft extends and which has an inner surface axially overlapping said apertures and having thereon a like-number of spaced lobes having a total arcuate extent of less than ninety degrees and having therebetween receiving spaces having a total arcuate extent of greater than 270 degrees, said lobes having thereon respective surface portions extending radially inwardly, having respective innermost portions, and respectively engaging said balls when said balls extend outwardly of said apertures, an actuator extending in said axial bore in said shaft and being movable between axially spaced drive and neutral positions, said actuator having a longitudinal axis and including means for selectively engaging said balls to establish drive and neutral conditions, said means comprising, in association with each of said balls, an axially extending groove in said actuator, said grooves each including a shallow portion located such that, when said actuator is in said drive position, said shallow portions are aligned with said apertures and engage said balls to force said balls radially outwardly of said apertures so that said balls are engaged by said surface portions to establish rotary drive of said shaft by said gear, said grooves each also including a deep portion located such that, when said actuator is in said neutral position, said deep portions are respectively aligned with said apertures and permit receipt therein of at least a portion of said balls so that said balls are not engaged by said surface portions, and cam means engageable with said actuator for selectively moving said actuator from said neutral position to said drive position, said cam means being movable to a first position wherein said actuator is in said neutral position, to a second position wherein said actuator is in said drive position, to a first intermediate position located between said first position and said second position and wherein said actuator is located such that said balls are tangentially aligned with said radially innermost portions, and to a second intermediate position located between said first intermediate position and said second position and wherein said actuator is located such that said shallow portions extend tangentially relative to said balls, said cam means including a surface which engages said actuator and which is shaped such that the angle formed by said axis and a line perpendicular to said surface at the point of contact between said surface and said actuator is approximately forty-seven degrees when said cam means is between said first position and said first intermediate position, decreases from approximately forty-seven degrees to approximately twenty degrees when said cam means is between said first intermediate position and said second intermediate position and said second intermediate position, and decreases from approximately twenty degrees to approximately zero degrees when said cam means is between said second intermediate position and said second position, and means for selectively moving said actuator from said drive position to said neutral position.

34. A marine propulsion device comprising a lower unit including a propeller shaft supported for rotary movement, said propeller shaft including an axial bore defining an annular wall having therethrough an aperture communicating with said bore, said aperture having a radially extending axis, a bevel gear mounted in said lower unit generally coaxially with said shaft for rotation relative to said shaft, said gear including an axial passage which receives said shaft and which has an inner surface axially overlapping said aperture and having thereon a surface portion extending radially inwardly, a ball which is located in said aperture and which is movable radially outwardly to be engaged by said surface portion, an actuator extending in said axial bore in said shaft and being movable relative to a drive position, said actuator including a main portion having therein an axial bore, and means for selectively engaging said ball to establish a drive condition, said means comprising an axially extending groove in said main portion, said groove communicating with said axial bore in said main portion, and said groove including a groove portion located such that, when said actuator is in said drive position, said groove portion is aligned with said aperture and engages said ball to force said ball radially outwardly relative to said aperture so that said ball is engaged by said surface portion to establish rotary drive of said shaft by said gear, and said actuator also including an end portion extending in said axial bore in said main portion so as to permit rotation of said main portion relative to said end portion, and cam means engageable with said end portion of said actuator for moving said actuator relative to said drive position.

35. A marine propulsion device comprising a lower unit including a propeller shaft supported for rotary movement, said propeller shaft including an axial bore defining an annular wall having therethrough an aperture communicating with said bore, said aperture having a radially extending axis, a bevel gear mounted in said lower unit generally coaxially with said shaft for rotation relative to said shaft, said gear including an axial passage which receives said shaft and which has an inner surface axially overlapping said aperture and having thereon a surface portion extending radially inwardly, a ball which is located in said aperture and which is movable radially outwardly to be engaged by said surface portion, an actuator extending in said axial bore in said shaft and being movable between axially spaced drive and neutral positions, said actuator including a main portion having therein an axial bore, and means for selectively engaging said ball with said gear to establish drive and neutral conditions, said means comprising an axially extending groove in said main portion, said groove communicating with said axial bore in said main portion, and said groove including a deep portion located such that, when said actuator is in said neutral position, said deep portion is aligned with said aperture and permits receipt of at least portion of said ball in said deep portion so that said ball is not engaged by said surface portion, said groove also including a shallow portion located such that, when said actuator is in said drive position, said shallow portion is aligned with said aperture and engages said ball to force said ball radially outwardly relative to said aperture so that said ball is engaged by said surface portion to establish rotary drive of said shaft by said gear, and said actuator also including an end portion extending in said axial bore in said main portion so as to permit rotation of said main portion relative to said end portion, and so that axial movement of said end portion in the direction from said neutral position to said drive position causes movement of said main portion in said direction, and cam means engageable with said end portion of said actuator for moving said actuator from said neutral position to said drive position.

36. A marine propulsion device as set forth in claim 35 wherein said cam means is movable from a first position to a second position for moving said actuator from one of said neutral position and said drive position to the other of said neutral position and said drive position, and wherein said device further comprises spring means engageable with said actuator for biasing said actuator from said other position to said one position, whereby said actuator moves from said other position to said one position under the influence of said spring means when said cam means moves from said second position to said first position.

37. A marine propulsion device as set forth in claim 35 wherein said annular wall of said propeller shaft has therethrough a number of axially aligned, spaced, radially extending apertures communicating with said bore, wherein said marine propulsion device comprises a number of balls which are located in respective ones of said apertures and which are movable partially and radially outwardly of said apertures, and wherein said inner surface of said bevel gear has thereon a number of spaced lobes having a total arcuate extent of less than ninety degrees and having therebetween receiving spaces having a total arcuate extent of greater than 270 degrees, and said lobes having thereon respective surface portions extending radially inwardly, said surface portions engaging respective ones of said balls when said balls extend outwardly of said apertures.

38. A marine propulsion device comprising a lower unit including a propeller shaft supported for rotary movement, said propeller shaft including an axial bore defining an annular wall having therethrough a number of angularly spaced, radially extending apertures located in a plane perpendicular to said propeller shaft and communicating with said bore, a like-number of balls which are respectively located said apertures and which are movable partially and radially outwardly of said apertures, a bevel gear mounted in said lower unit generally coaxially with said propeller shaft for rotation relative to said propeller shaft, said bevel gear including an axial passage which receives said shaft and which has an inner surface axially overlapping said apertures and having thereon alike-number of spaced lobes, said lobes having thereon respective surface portions extending radially inwardly, said surface portions respectively engaging said balls when said balls extend outwardly of said apertures, said lobes having a total arcuate extent of less than ninety degrees, said lobes having therebetween receiving spaces having a total arcuate extent of greater than 270 degrees, and an actuator extending in said axial bore in said shaft and being movable relative to a drive position, said actuator including means for selectively engaging said balls to establish a drive condition, said means comprising, in said actuator, an actuator portion located such that, when said actuator is in said drive position, said actuator portion is aligned with said apertures and engages said balls to force said balls radially outwardly relative to said apertures so that said balls are engaged by said surface portions to establish rotary drive of said shaft by said gear.

39. A marine propulsion device as set forth in claim 38 and further comprising cam means engageable with said actuator and movable from a first position to a second position for moving said actuator from one of said neutral position and said drive position to the other of said neutral position and said drive position, and spring means engageable with said actuator for biasing said actuator from said other position to said one position, whereby said actuator moves from said other position to said one position under the influence of said spring means when said cam means moves from said second position to said first position.

* * * * *

UNITED STATES PATENT AND TRADEMARK OFFICE
CERTIFICATE OF CORRECTION

PATENT NO. : 4,789,366

DATED : December 6, 1988

INVENTOR(S) : Gordon B. Hale et al.

Page 1 of 2

It is certified that error appears in the above-identified patent and that said Letters Patent is hereby corrected as shown below:

Column 7, line 22, the word "bee" should read --been--.

Column 8, line 38, the word "shift" should read --shaft--.

Column 13, line 54, after the word "shaft" insert --,--.

Column 14, line 1, the word "portions" should read --portion--.

Column 17, line 21, the word "place" should read --plane--.

Column 18, line 11, after the word "having" insert the words --therethrough a number of--.

Column 19, line 50, after the word "portion" insert --,--.

Column 20, line 46, the word "define" should read --defining--.

Column 20, line 46, before the word "therethrough" insert the words --annular wall having--.

Column 20, line 62, the word "portion" should read --portions--.

Column 21, line 9, the word "locate" should read --located--.

Column 21, line 43, before the ",", insert the words --wherein said actuator is in said neutral position--.

Column 21, line 46, the word "deposition" should read --position--.

UNITED STATES PATENT AND TRADEMARK OFFICE
CERTIFICATE OF CORRECTION

PATENT NO.  : 4,789,366

DATED       : December 6, 1988

INVENTOR(S) : Gordon B. Hale et al.

It is certified that error appears in the above-identified patent and that said Letters Patent is hereby corrected as shown below:

Column 22, line 13, after the word "said" insert the words --axial bore in said shaft and being movable between--.

Column 22, line 40, before the word "said" insert the word --and--.

Column 23, line 18, the word "nd" should read --and--.

Column 24, line 5, delete the words "and said second intermediate position".

Column 24, line 67, after the word "least" insert the word --a--.

Signed and Sealed this

Seventeenth Day of July, 1990

Attest:

HARRY F. MANBECK, JR.

*Attesting Officer*   Commissioner of Patents and Trademarks